(12) United States Patent
Kim et al.

(10) Patent No.: US 7,769,377 B2
(45) Date of Patent: Aug. 3, 2010

(54) METHOD FOR PROVIDING A TONE REPLACING SOUND CHOSEN BY A SUBSCRIBER IN CALL WAITING SERVICE

(75) Inventors: Ki Mun Kim, Incheon-si (KR); Yeong Tae No, Seoul (KR); Sang Yun Lee, Seongnam (KR); Hee Hyeok Hahm, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 10/526,077

(22) PCT Filed: Aug. 12, 2003

(86) PCT No.: PCT/KR03/01624

§ 371 (c)(1),
(2), (4) Date: Oct. 4, 2005

(87) PCT Pub. No.: WO2004/021690

PCT Pub. Date: Mar. 11, 2004

(65) Prior Publication Data

US 2006/0128381 A1    Jun. 15, 2006

(30) Foreign Application Priority Data

Aug. 29, 2002    (KR) .................... 10-2002-0051548

(51) Int. Cl.
*H04W 4/00* (2009.01)

(52) U.S. Cl. ...................... 455/433; 455/466

(58) Field of Classification Search ............ 379/114.13; 455/433, 456.1, 466, 406; 370/338
See application file for complete search history.

(56) References Cited

U.S. PATENT DOCUMENTS 4,433,496 A    2/1984    Jones et al.
(Continued)

FOREIGN PATENT DOCUMENTS

EP    1 071 264    *    1/2001
(Continued)

OTHER PUBLICATIONS

Method for Notifying Various Call States in Switching System (Suk Hong Park). PN=1990-0055454.*
(Continued)

*Primary Examiner*—George Eng
*Assistant Examiner*—Michael Faragalla
(74) *Attorney, Agent, or Firm*—Lowe Hauptman Ham & Berner LLP (57)    ABSTRACT

The present invention relates to method for providing an arbitrary sound chosen by a called subscriber instead of an ordinary tone to a calling or call-waiting subscriber. In this present invention, if a call is received, a terminating exchanger requests a trunk connection to a sound db server based on the first information on whether or not to replace an ordinary tone and the second information on a route to the sound db server that were received from a home location register (HLR) when a called was registered, and provides the called identification and call state (idle/busy or call-waiting, etc.) for the sound server. Then, the sound db server searches its db for a sound associated with the call state specified by the called, and provides the found sound for the caller instead of a conventional tone via the terminating exchanger. Through this sequential procedure of network elements, a caller can hear a sound specified by a called instead of a dry ordinary tone.

7 Claims, 7 Drawing Sheets

U.S. PATENT DOCUMENTS 6,603,844 B1 * 8/2003 Chavez et al. .......... 379/114.13
2001/0041600 A1 * 11/2001 Becker et al. ................ 455/567

FOREIGN PATENT DOCUMENTS

| KR | 10-1999-0055454 | | 7/1999 |
| KR | 1019990055454 | | 7/1999 |
| KR | 10-2000-0000244 | | 1/2000 |
| KR | 1020000000244 | | 1/2000 |
| KR | 10-2001-0079142 | | 8/2001 |
| KR | 1020010079142 | | 8/2001 |
| KR | 10-2002-0039501 | | 5/2002 |
| KR | 2002040481 | * | 5/2002 |
| KR | 1020020039501 | | 5/2002 |
| KR | 1020020097041 | | 12/2002 |
| KR | 1020020097043 | | 12/2002 |
| KR | 1020020097049 | | 12/2002 |
| KR | 1020020097050 | | 12/2002 |
| KR | 1020020097077 | | 12/2002 |
| KR | 1020020097078 | | 12/2002 |
| WO | 20041016014 | | 2/2004 |
| WO | 20041016029 | | 2/2004 |
| WO | 20041021690 | | 3/2004 |
| WO | WO 2005/004453 | * | 1/2005 |

OTHER PUBLICATIONS

Method and Device for Generating Alternative Sound of Ringback Tone Communication Network (Jong-Hyeun Park). Korean Laid-Open Patent No. 2000-0000244.*

* cited by examiner

| Parameter=CallingFeaturesIndicator2 | | | | Length=V | | | | Tag=H'9fff7d | |
|---|---|---|---|---|---|---|---|---|---|
| Contents | | | | | | | | meaning | |
| H | G | F | E | D | C | B | A | Octet | Notes |
| VMSB | | VMSU | | MC | | CC | | 1 | |
| FMSNA | | FMSB | | FMSU | | VMSNA | | 2 | a |
| SRBT | | NCW | | Prefer_Sys | | MUDN | | 3 | |
| ........... | | | | | | | | n | |

*defined 'reserve' field before*

FIG. 8

| subscriber information | sound code for event |
|---|---|
| XXX-XXX-0001 | default code |
| | code for each caller or each caller group |
| | code for each calling time zone |
| | code for busy |
| | code for call-waiting |
| | ⋮ |
| XXX-XXX-0002 | default code |
| | code for each caller or each caller group |
| | code for each calling time zone |
| | code for busy |
| | code for call-waiting |
| | ⋮ |
| ⋮ | ⋮ |

METHOD FOR PROVIDING A TONE REPLACING SOUND CHOSEN BY A SUBSCRIBER IN CALL WAITING SERVICE

CROSS REFERENCE TO RELATED APPLICATION

This application is the National Phase application of International Application No. PCT/KR2003/001624, filed Aug. 12, 2003, which designates the United States and was published in English. This application, in its entirety, is incorporated herein by reference.

TECHNICAL FIELD

The present invention relates to a method for providing an arbitrary sound chosen by a called subscriber for a calling subscriber instead of a conventional RBT (RingBack Tone).

The present invention further relates to a method for providing an arbitrary sound chosen by a called subscriber instead of a common RBT and a CWT (Call-Waiting Tone) that are provided for a caller in case that the called has been subscribed to CWS (Call-Waiting Service).

BACKGROUND ART

When a subscriber calls another through a mobile communication network, a terminating exchanger on the network provides the caller with a uniform RBT.

Since the RBT is same all the time, a caller can not identify a called before the called answers. Furthermore, the uniform RBT can not satisfy various subscribers' needs to reveal their personality.

In addition, a mobile communication network provides CWS in commerce. In CWS, however, an exchanger serving a called and a former caller, who are talking each other, provides a latter caller with a uniform RBT, and also provides a uniform CWT, which is different in sound from RBT, for a call waiter who is selected to wait by the called. Therefore, a latter caller can not identify a called before the called answers and the uniform CWT can not satisfy various subscribers' needs to reveal their personality.

On the other hand, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional RBT still has the aforementioned drawbacks. That is, a caller can not identify a called before the called answers and the uniform RBT can not satisfy various subscribers' needs to reveal their personality as explained above.

DISCLOSURE OF INVENTION

It is an object of the present invention to provide method for providing an arbitrary sound chosen or registered by a called subscriber for a caller or a call waiter instead of a conventional RBT and/or CWT. In the present method, an arbitrary tone-replacing sound chosen or registered by a subscriber is stored in a server separated from mobile exchangers first, and if a certain subscriber, who is already in communication with a former caller, is called again, a terminating exchanger for the additional call receives from the server a tone-replacing sound that is assigned to the called, and then provides the received sound for a latter caller instead of a conventional RBT. And, the terminating exchanger provides one of the callers, who is selected to wait call reconnection by the called, with a CWT-replacing sound received from the sever instead of a conventional common CWT.

A method of providing an arbitrary sound to replace a conventional tone in a communication network in accordance with the present invention is characterized in that it comprises: a first step, conducted by an HLR (Home Location Register), of furnishing an exchanger, when a terminal is registered through the exchanger, with first information on whether an ordinary tone is to be replaced or not and second information informing a route to a sound providing means; a second step, conducted by the exchanger, of requesting a trunk connection to the sound providing means, if the terminal is called by a caller, based on the first and the second information while furnishing the sound providing means with third information on call state; and a third step, conducted by the sound providing means, of determining a tone-replacing sound based on the received third information for the terminal, and providing the determined tone-replacing sound as an RBT to the caller through the exchanger which the trunk connection is made to.

Another method of providing an arbitrary sound to replace a conventional tone in a communication network in accordance with the present invention is characterized in that it comprises: a first step, conducted by an HLR, of furnishing an exchanger, when a terminal is registered through the exchanger, with first information on whether an ordinary tone is to be replaced or not and second information informing a route to a sound providing means; a second step, conducted by the exchanger, of requesting a first trunk connection to the sound providing means, if the terminal is called by a latter caller under already-connected condition to a former caller, based on the first and the second information while providing the sound providing means with third information on call state; a third step, conducted by the sound providing means, of determining a tone-replacing sound based on the received third information for the terminal, and providing the determined tone-replacing sound as an RBT to the latter caller through the exchanger; a fourth step, conducted by the exchanger, of requesting release of the first trunk connection to the sound providing means, if the terminal accepts the call from the latter caller, and requesting a second trunk connection to the sound providing means for the connected former caller while providing the sound providing means with fourth information on call-switched; and a fifth step, conducted by the sound providing means, of determining a tone-replacing sound based on the received fourth information for the terminal, and providing the determined tone-replacing sound as a CWT to the former caller through the exchanger which the second trunk connection is made to.

In the methods, the third information is to indicate that the called, who has subscribed to CWS, is busy, namely already-connected, and the fourth information is to indicate that either of callers is made to call-waiting state by the called.

The above-characterized tone replacing sound providing method is able to decrease caller's cancellation and/or call-waiter's drop of a call connected to a called who has subscribed to CWS.

In addition, the method can provide a personal ad way by allowing a registered personal introducing or identifying sound to be used instead of an RBT. Moreover, a caller is able to know by only hearing a tone-replacing sound whether he or she called rightly. An enterprise as well as individual persons can advertise efficiently through registering a tone-replacing sound.

BRIEF DESCRIPTION OF DRAWINGS

In the drawings:

FIG. 1 is a simplified diagram of a mobile communication network which a subscriber-based tone-replacing sound providing method is embedded in;

MODES FOR CARRYING OF THE INVENTION

In order that the invention may be fully understood, a preferred embodiment thereof will now be described with reference to the accompanying drawings.

Figure 1:
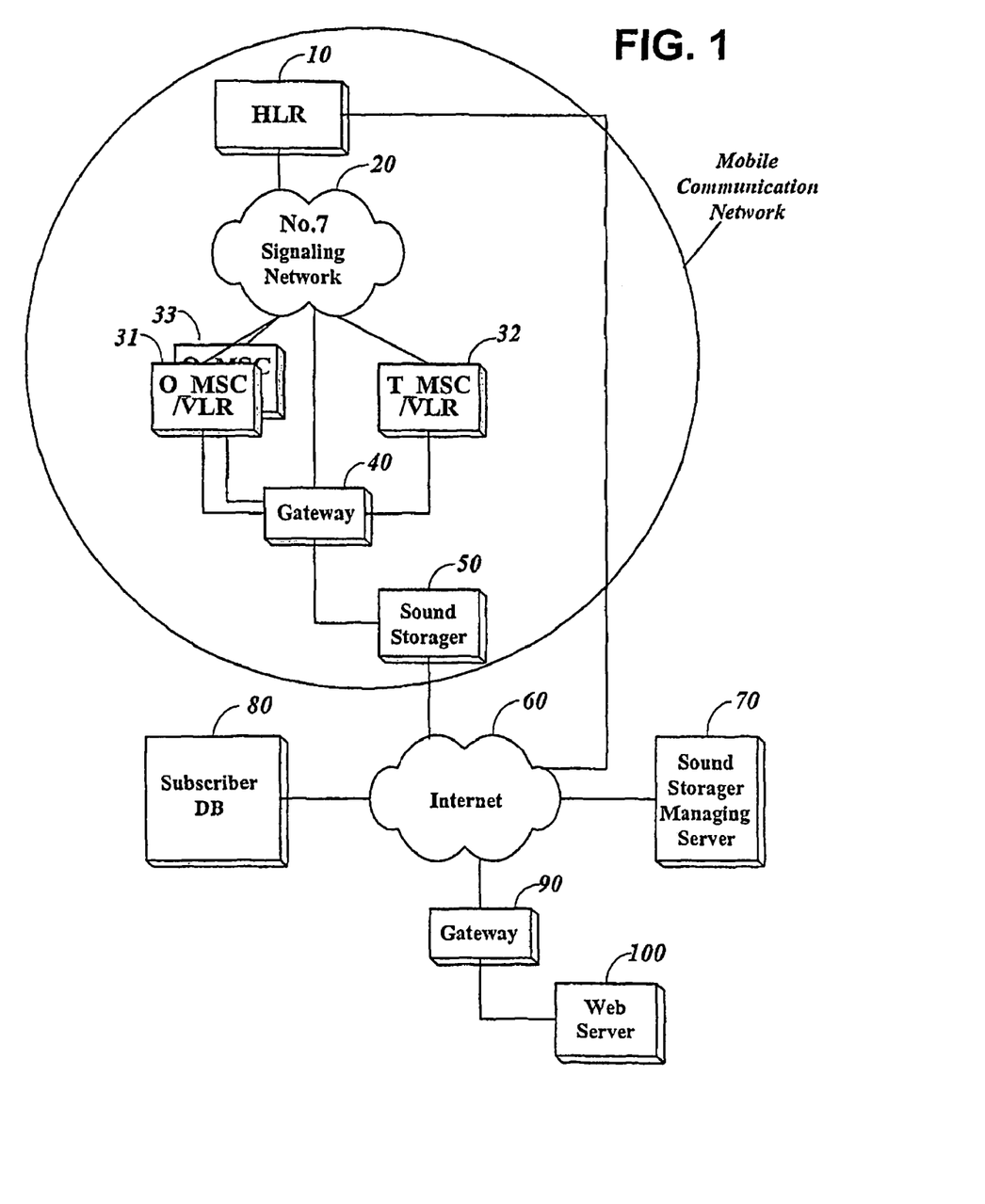

FIG. 1 is a simplified diagram of a mobile communication network which a CWS subscriber-based tone-replacing sound providing method is embedded in.

The network of FIG. 1 includes an HLR (Home Location Register) 10; mobile exchangers 31, 32 and 33 (also called 'MSC' (Mobile Switching Center)) being capable of communicating with the HLR 10 via a No. 7 signaling network 20 based on No. 7 signaling transfer protocol; a sound storager 50, connected to the No. 7 signaling network 20 via a gateway 40, storing tone-replacing sounds and communicating with the exchangers 31, 32 and 33; an SSMS (Sound Storager Managing Server) 70, connected to the sound storager 50 via Internet 60, controlling management of tone-replacing sounds in the sound storager 50; a subscriber db 80 connected to the HLR 10 via Internet 60; and a web server 100, connected to Internet 60 via a gateway 90, communicating with the sound storager 50 and the SSMS 70.

The HLR 10 functions as a conventional network element and it has in every subscriber profile the first information on whether an ordinary tone is to be replaced or not and the second information informing a route to the sound storager 50. The first and the second information are written in the value-added service parameters of each subscriber profile.

Every mobile exchanger in the network, that functions as a conventional network element, receives the first and the second information of a subscriber through communicating with the HLR 10 when the subscriber requests location registration. If the location-registered subscriber is called, the exchanger 31, 32 or 33 receives a tone-replacing sound from the sound storager 50 based on the received first and second information, and then provides a caller with the received tone-replacing sound instead of an ordinary tone.

Moreover, if the called has been also subscribed to CWS, the exchanger 31, 32 or 33 furnishes the sound storager 50 with state information (information about busy or not and call-suspended state) of the called through a connection request message when it requests trunk connection to the sound storager 50.

The sound storager 50 stores a plurality of digital sounds to be used for replacing an ordinary tone such as RBT and CWT. The stored digital sounds are provided for the exchangers 31, 32 and 33 via the gateway 40.

The SSMS 70 communicates with the sound storager 50 via Internet 60 and it chooses a digital sound based on information written in a tone service table. A unique code to identify the chosen digital sound is notified the sound storager 50 in order that a stored sound identified by the code is sent to the exchanger 31, 32 or 33 from the sound storager 50. The tone service table used for choice of a digital sound allocated for each subscriber includes several codes linked to caller's personal information, caller or caller-group identifying information, call time zone, and/or call state. Therefore, a digital sound can be chosen by the SSMS 70 based on who calls, which group a caller belongs to, age, sex, or occupation of a caller, when a subscriber is called, and/or call state, e.g., busy or call-suspended state.

Information in the tone service table is determined when a person subscribes to the value-added service and is then modified by his or her request.

The web server 100, connected to the sound storager 50 and/or the SSMS 70 via Internet 60, adds digital sounds to the sound storager 50 and conducts operations to update or change contents of the tone service table and codes, if necessary, related digital sounds for the SSMS 70. The updating or changing operation is initiated by subscriber's request through web pages of the web server 100.

The operation of the network of FIG. 1 to provide an arbitrary sound set by a called subscriber instead of a common RBT is described below.

When a subscriber applies for subscription to the value-added service of RBT replacement, all information included in the application is stored in the subscriber db 80 that requests registration of RBT replacement service to the HLR 10. Then, the HLR 10 writes necessary information in value-added service parameters of that subscriber.

Afterwards, if location registration for that subscriber is requested from a serving exchanger 31, 32 or 33, e.g., the exchanger 32 the HLR 10 provides service-related information and routing information for the exchanger 32 that requested location registration. The routing information is needed to make a trunk connection to the sound storager 50. The exchanger 32 registers the received information for that subscriber in a local subscriber db.

If an arbitrary subscriber at the exchanger 31 calls the location-registered subscriber, a trunk connection 'ISUP' is made between the originating 31 and the terminating exchanger 32 after routing information exchange through the HLR 10. After a trunk connection is setup, the terminating exchanger 32, knowing based on the registered information of the called subscriber that RBT replacement service is ON, makes another trunk connection to the sound storager 50 addressed by the registered information. At the same time, the terminating exchanger 32 provides the sound storager 50 with information of the called subscriber, e.g., mobile telephone number and starts to page the called.

The sound storager 50 inquires of the SSMS 70 about which digital sound is set now for the called subscriber. Then, the SSMS 70 informs the sound storager 50 of a code for digital sound having been chosen for a given condition by the called.

The sound storager 50 sends a digital sound identified by the received code to the originating exchanger 31 through the setup trunk connection between the two exchangers 31 and 32. The originating exchanger 31 transmits the digital sound from the sound storager 50 to the caller until the called answers the paging. Thus, the caller can hear the digital sound instead of a conventional RBT during the paging. The moment the called answers the paging, the terminating exchanger 32 releases the trunk connection established to the sound storager 50. The conversation between the caller and the called is communicated through the trunk connection made between the originating 31 and the terminating exchanger 32.

Figure 2:
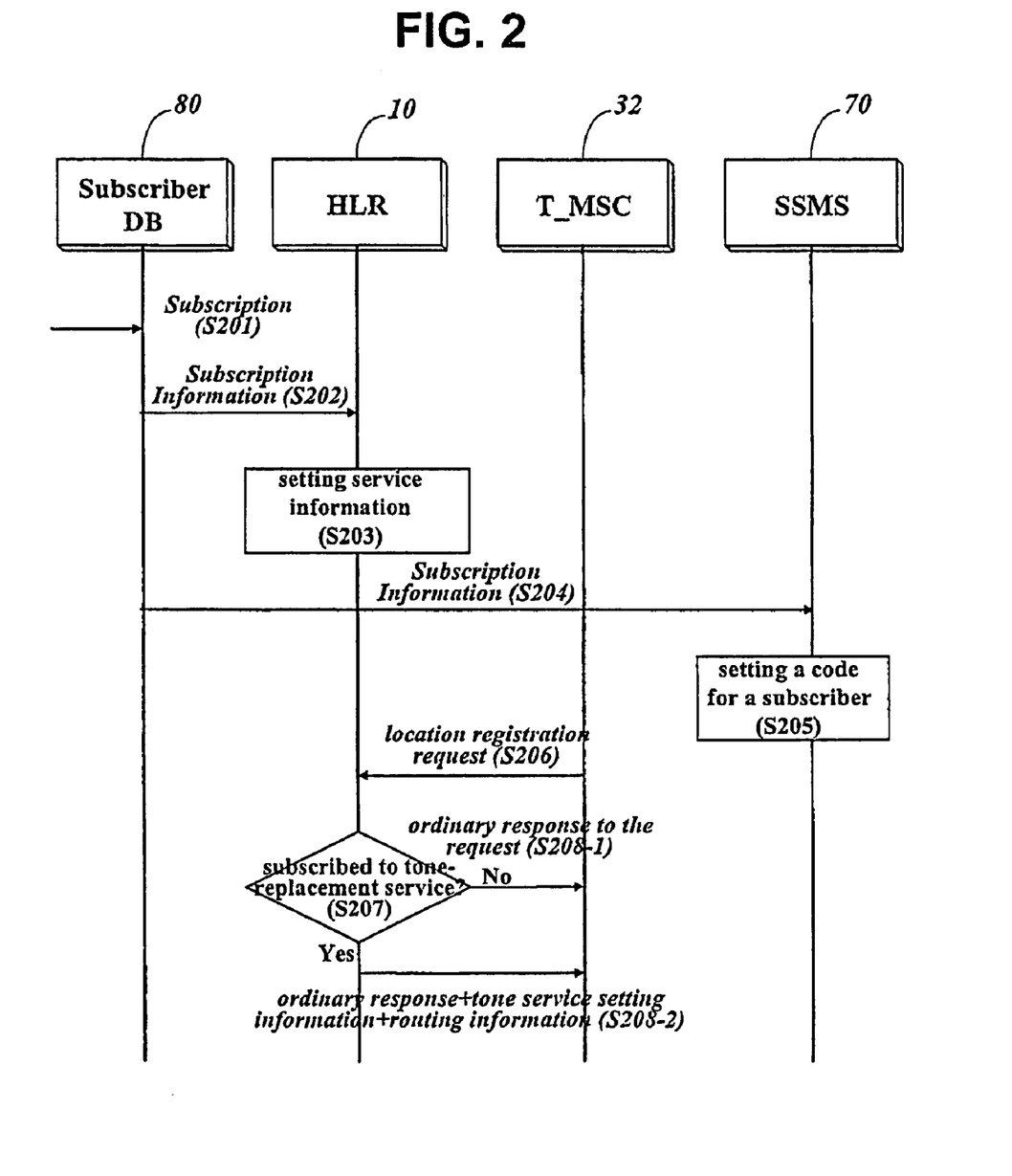
FIG. 2 is a procedure chart to subscribe to a subscriber-based tone-replacing sound providing service in accordance with the present invention.

FIG. 2 is a procedure chart to subscribe to a subscriber-based tone-replacing sound providing service in accordance with the present invention.

The procedure chart of FIG. 2 is explained below in parallel with the operation of the network of FIG. 1.

If subscription to the tone-replacement service is asked (S201), subscription information including mobile telephone number of the subscriber is stored in the subscriber db 80 first and is then delivered to the HLR 10 (S202). The HLR 10 updates service information of the subscriber profile to indicate that the subscriber has subscribed to tone replacement service (S203).

In addition, the subscriber db 80 also sends the subscription information including a chosen digital sound and mobile telephone number to the SSMS 70 (S204). The SSMS 70 writes a code associated with the chosen digital sound in a tone service table allocated for that mobile telephone number (S205).

If the received subscription information includes particulars of sound assignments, namely if the received subscription information assigns different digital sounds for each caller, each caller group, each time zone, and/or each call state, the SSMS 70 writes different codes of the respective digital sounds in each condition field of the tone service table, at the step S205.

Afterwards, if location registration for the subscriber is requested from the exchanger 32 to the HLR 10 (S206), the HLR 10 checks profile of the subscriber to know whether the subscriber has been subscribed to the RBT replacement service (S207). If not subscribed, the HLR 10 sends an ordinary response message to the location registration request to the exchanger 32 as in the conventional request processing procedure (S208-1). However, if subscribed, the HLR 10 sends the exchanger 32 a response message including tone replacement service-related information, namely, service setting information and routing information, e.g., routing digits to direct to the sound storager 50 assigned for that subscriber among a plurality of sound storagers (not figured). The exchanger 32 registers the received information in the subscriber's profile on a local db, e.g., a VLR (Visitor Location Register) (S208-2).

Figure 7:
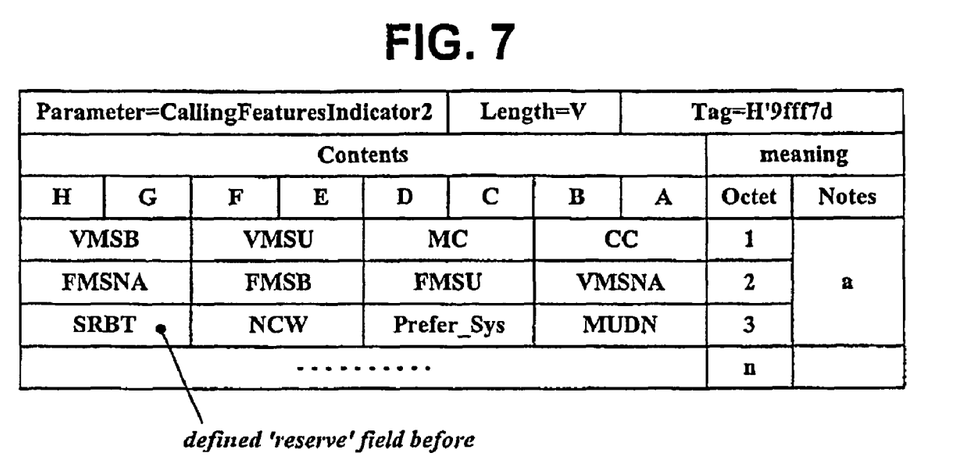
FIG. 7 shows format of the value-added service parameters including a tone-replacing service setting field that are delivered from an HLR to a call-terminating exchanger.

The service setting information can be carried by an SRBT (Specific RBT) field, which was defined as a 'reserve' field before, of the value-added service parameters 'CallingFeaturesIndicator2' shown in FIG. 7. The 2-bit SRBT field is set to '10' in case that the tone replacement service is not activated even though that service is valid by subscription, and it is set to '11' in case that the tone replacement service is in active state. A message including the parameters 'CallingFeaturesIndicator2' responsive to the location registration request is delivered from the HLR 10 to the exchanger 32.

The service information parameters 'CallingFeaturesIndicator2' of FIG. 7 are composed of a VMSB field indicative of state of voice mail service busy; a VMSU field indicative of state of voice mail service busy unconditional; a VMSNA field indicative of state of voice mail service busy no answer; an FMSNA field indicative of state of fax mail service no answer; an FMSB field indicative of state of fax mail service busy; an FMSU field indicative of state of fax mail service unconditional; an MC field indicative of multi-call; a CC field indicative of conference call; an MUDN field indicative of multiple unit directory number; and others.

Figure 3:
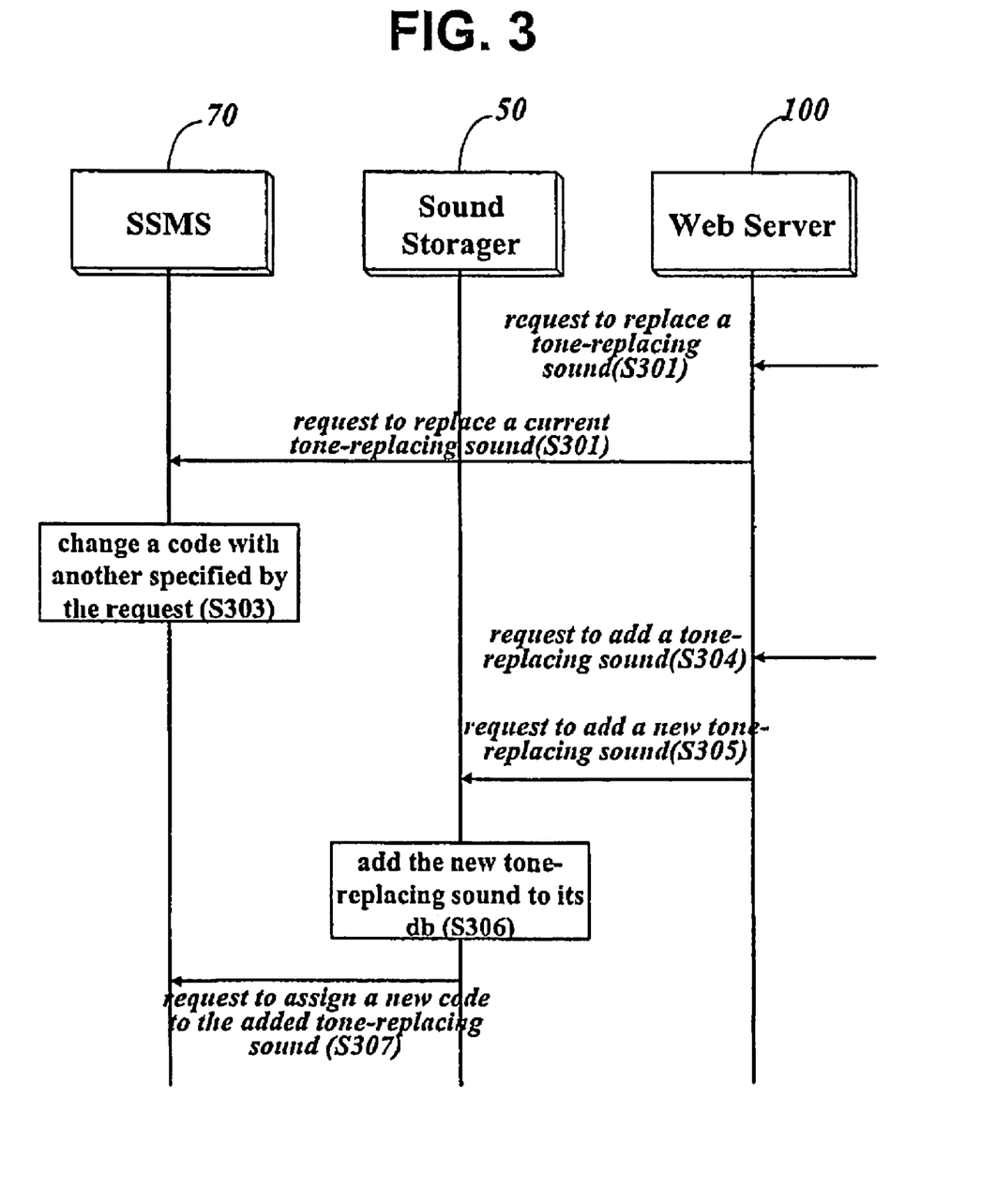
FIG. 3 is a procedure chart to change/add tone-replacing sound to be used in tone replacement service in accordance with the present invention.

FIG. 3 is a procedure chart to change/add tone-replacing sound to be used in tone replacement service in accordance with the present invention.

A subscriber, who has subscribed to the tone replacement service according to the above-explained procedure of FIG. 2, connects his or her personal computer to the web server 100, first. Then, the web server 100 provides web pages on the connected computer screen to enable the subscriber to change/add information about tone replacement service.

The subscriber enters mobile telephone number (or telephone number+password allocated in subscription) through an adequate web page and then selects a desired tone-replacing sound from a list showing all or a part of sounds stored in the sound storager 50. If the subscriber requests change of tone-replacing sound to the chosen one (S301), the web server 100 sends a change-requesting message to the SSMS 70 (S302). The SSMS 70 changes the current code with another code assigned to the chosen tone-replacing sound in a tone service table allocated for the entered mobile telephone number (S303). Afterwards, a tone-replacing sound identified by the changed code will be provided instead of a conventional RBT and/or CWT.

If the subscriber selects to add a new tone-replacing sound on a web page, the SSMS 70 provides an input web page. Then, the subscriber enters his or her mobile telephone number in the input web page and uploads a sound file including voice, sound logo, or music through the input web page (S304). The web server 100 requests the sound storager 50 to add a new tone-replacing sound by delivering the inputted data to the sound storager 50 (S305). The sound storager 50 registers the uploaded sound file as a new tone-replacing sound (S306) and requests the SSMS 70 to assign a new code to the registered tone-replacing sound (S307). The SSMS 70 informs the sound storager 50 of the newly-assigned code and changes the current code with the newly-assigned code in the tone service table allocated for the subscriber.

Figure 4:
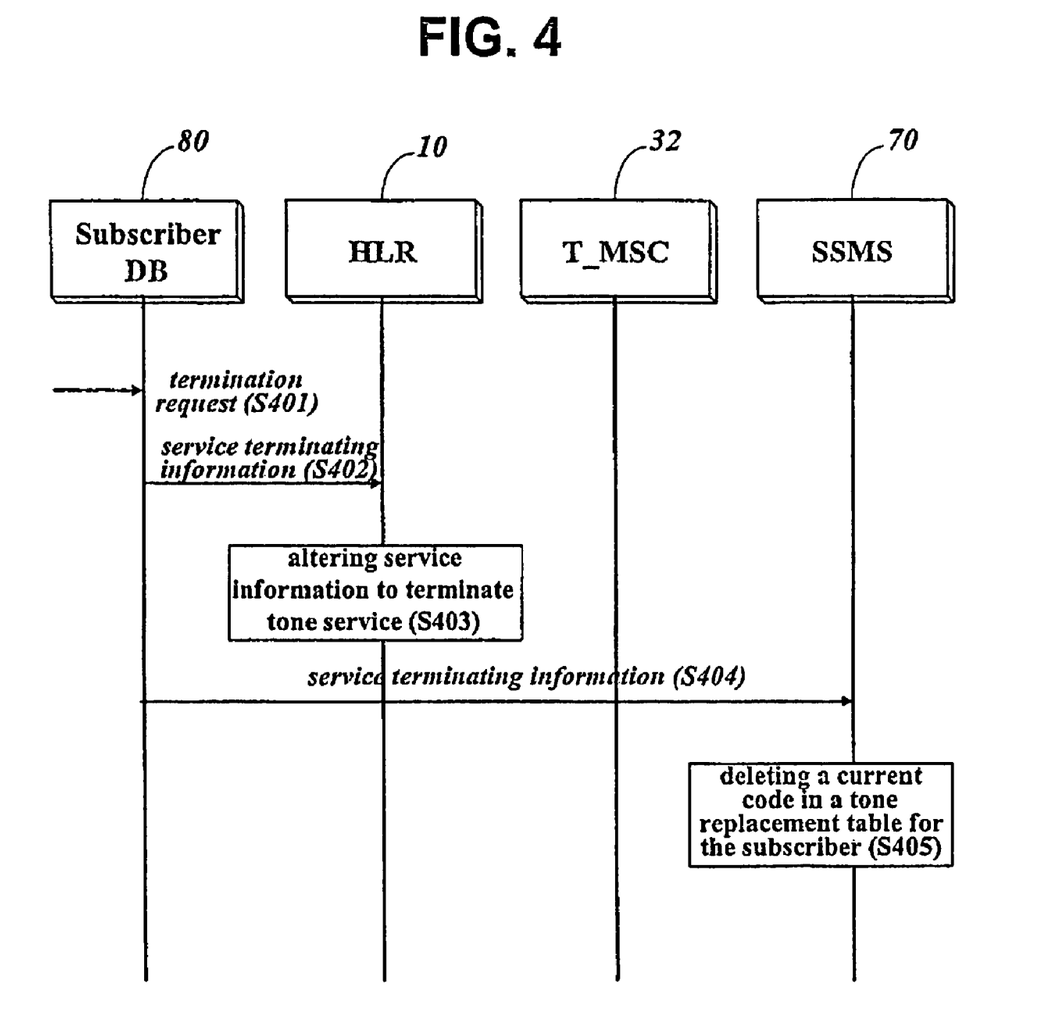
FIG. 4 is a procedure chart to terminate a subscriber-based tone-replacement service in accordance with the present invention.

FIG. 4 is a procedure chart to terminate a subscriber-based tone-replacement service in accordance with the present invention.

If termination of tone replacement service is asked from a subscriber (S401), the subscriber db 80 deletes subscription information for tone replacement service associated with the subscriber, namely, the subscriber's telephone number, and sends service terminating information including a mobile telephone number to the HLR 10 (S402). The HLR 10 alters service information of the subscriber's profile to indicate that the subscriber has not subscribed to tone replacement service (S403).

The subscriber db 80 also sends the service terminating information to the SSMS 70 (S404), then the SSMS 70 deletes a current code in the tone service table for the subscriber based on the received service terminating information (S405).

Figure 5:
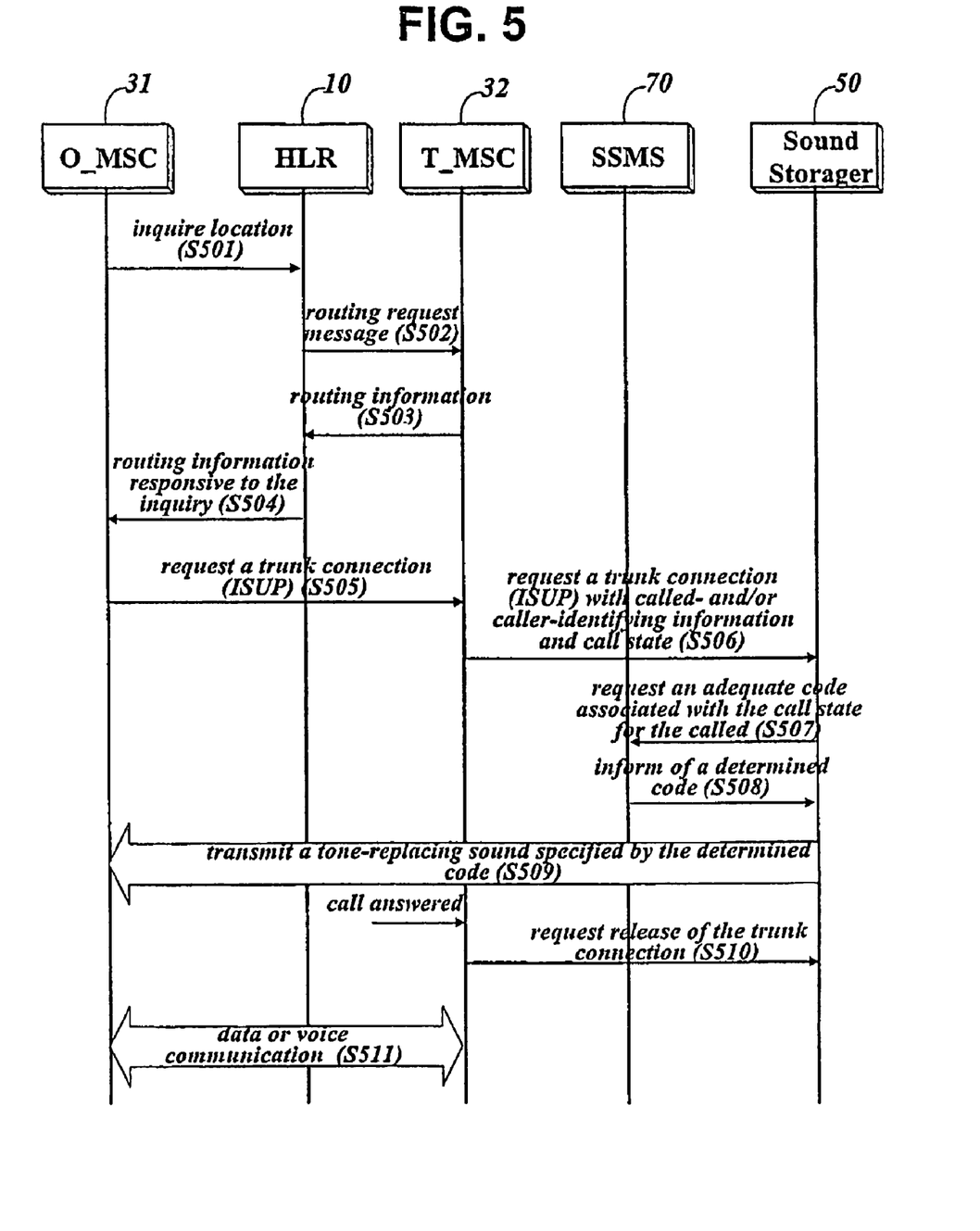
FIG. 5 is a procedure chart of an embodiment of the present invention to conduct a CWS subscriber-based tone-replacing service.

FIG. 5 is a procedure chart of an embodiment of the present invention to conduct a CWS subscriber-based tone-replacing service after completion of the procedure of FIG. 2 and/or FIG. 3.

If an arbitrary subscriber within a service zone of the exchanger 31 calls another subscriber, who has subscribed to the tone replacement service, within the exchanger 32, the originating exchanger 31 sends a location request message to the HLR 10 to inquire where the called is (S501). Then, the HLR 10 sends a routing request message to the terminating exchanger 32 (S502), and the terminating exchanger 32 informs the HLR 10 of routing information, e.g., TLDN (Temporary Local Directory Number) in response to the routing request message (S503).

The HLR 10 delivers the routing information to the originating exchanger 31 in response to the inquiry step S501 (S504). The originating exchanger 31 requests the terminating exchange 32 based on the routing information to make a trunk connection therebetween (S505).

In the meantime, the terminating exchanger 32 checks service setting information, namely, the 'SRBT' field of the value-added service information of FIG. 7 that was registered for the called in its local db at the step S208-2 in the procedure of FIG. 2. If the two bits of the 'SRBT' field are '11', the terminating exchanger 32 regards tone-replacement service for the called as 'in-service' and 'activated' and checks state (idle, busy or call-suspended) of the called if the called has subscribed to CWS. Then, it makes a trunk connection to the sound storager 50 with reference to the routing information that was also received and stored at the step S208-2. At this time, mobile telephone numbers of the caller and the called are sent to the sound storager 50 along with the checked the called's state (S506).

Now, respective trunk connections are made between the originating exchanger 31 and the terminating one 32 and between the terminating exchanger 32 and the sound storager 50.

The sound storager 50 asks an adequate code to the SSMS 70 while providing the received numbers and the called's state for the SSMS 70 (S507). The SSMS 70 examines a tone service table allocated for the called number to determine a code matched with the calling number and the called's state, and informs the sound storager 50 of the determined code (S508) in response to the code-requesting step S507. The sound storager 50 transmits a tone-replacing sound corresponding to the determined code to the caller instead of an RBT or another uniform tone through the trunk connections between the sound storager 50 and the terminating exchanger 32 and between the terminating exchanger 32 and the originating one 31 (S509).

The steps between S506 to S509 inclusive are explained in more detail.

In the event that the called has subscribed to CWS and not to tone-replacing service, the terminating exchanger 32 provides the caller with a uniform RBT if the called has already been connected to a former caller. However, if the called has subscribed to tone-replacing service, the state of busy is delivered to the sound storager 50 at the step S506. The sound storager 50 asks the SSMS 70 to notify of a sound code adequate to busy state of the called (S507) while giving necessary information such as called's identification to the SSMS 70.

Figure 8:
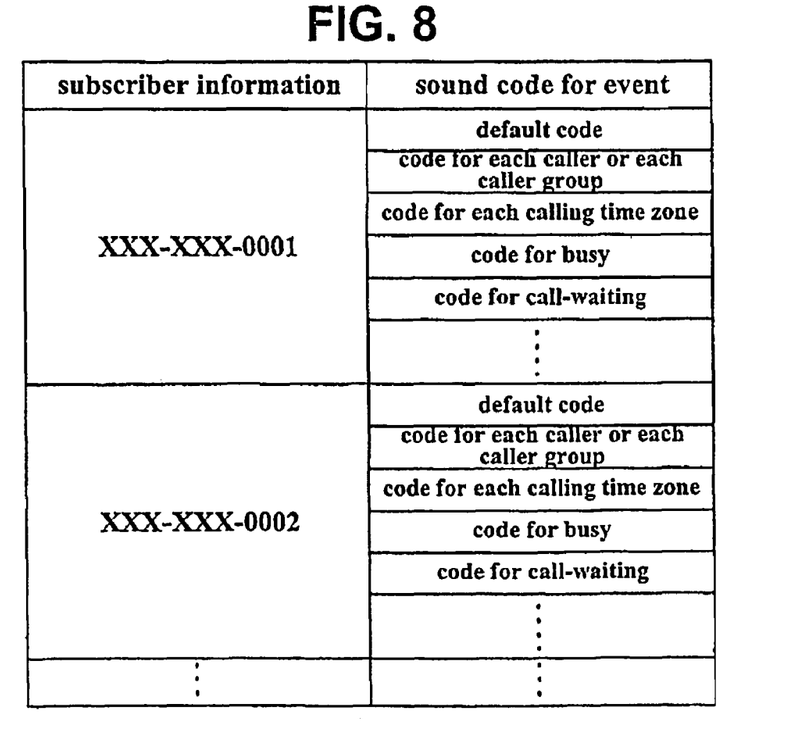
FIG. 8 shows an exemplary tone service table managed by a sound storager managing server to embody a tone-replacing sound providing service in accordance with the present invention.

Knowing that the called is busy from the received information, the SSMS 70 searches a tone service table of the called stored in its db structured as FIG. 8 for a sound code associated with busy state and delivers the found code to the sound storager 50 (S508) in response to the code-requesting step S507. The sound storager 50 transmits a tone-replacing sound linked with the determined code to the caller as an RBT through the trunk path made between the sound storager, 50 and the originating exchanger 31 (S509). Therefore, if a voice message to inform that call acceptance is being urged to a busy called is registered as a tone-replacing sound for busy state in CWS, a caller is able to know the current call state through the tone-replacing sound. This would decrease callers' call cancellations by leading callers to wait until call connection.

If the called answers the new call or switches to the new call of the terminating exchanger 32 from an already-connected call while the determined tone-replacing sound is being transmitted instead of a conventional RBT, the terminating exchanger 32 requests the sound storager 50 to release the established trunk connection (S510). Then, voice or data are communicated between the caller and the called through the trunk connection between the originating 31 and the terminating exchanger 32 (S511).

Figure 6:
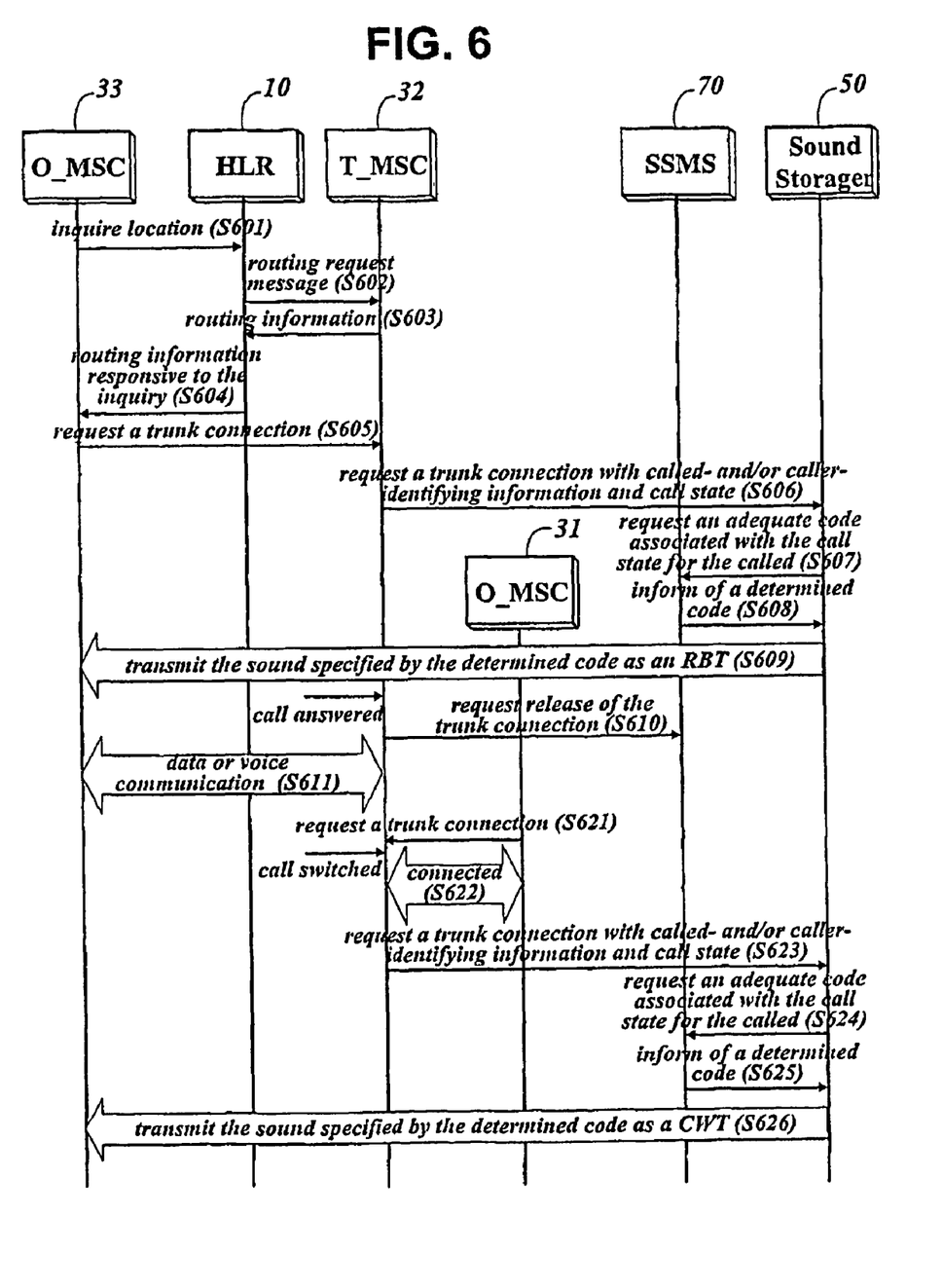
FIG. 6 is a procedure chart of another embodiment of the present invention to conduct a CWS (Call Waiting Service) subscriber-based tone-replacing service.

FIG. 6 is a procedure chart of another embodiment of the present invention to conduct a CWS subscriber-based tone-replacing service after completion of the procedure of FIG. 2 and/or FIG. 3.

If a first arbitrary subscriber within a service zone of a first originating exchanger 33 calls another subscriber, who has subscribed to both the tone replacement service and CWS, within the exchanger 32, the first originating exchanger 33 sends a location request message to the HLR 10 to inquire where the called is (S601). Then, the HLR 10 sends a routing request message to the terminating exchanger 32 (S602), and the terminating exchanger 32 informs the HLR 10 of routing information, e.g., TLDN (Temporary Local Directory Number) in response to the routing request message (S603).

The HLR 10 delivers the routing information to the first originating exchanger 33 in response to the inquiry step S601 (S604). The first originating exchanger 33 requests the terminating exchange 32 based on the routing information to make a trunk connection therebetween (S605).

In the meantime, the terminating exchanger 32 checks service setting information, namely, the 'SRBT' field of the value-added service information of FIG. 7 that was registered for the called in its local db at the step S208-2 in the procedure of FIG. 2. If the two bits of the 'SRBT' field are '11', the terminating exchanger 32 regards tone-replacement service for the called as 'in-service' and 'activated' and identifies idle state of the called. Then, it makes a trunk connection to the sound storager 50 with reference to the routing information that was also received and stored at the step S208-2. At this time, mobile telephone numbers of the caller and the called are sent to the sound storager 50 along with the identified idle state of the called (S606).

Now, respective trunk connections are made between the first originating exchanger 33 and the terminating one 32 and between the terminating exchanger 32 and the sound storager 50.

The sound storager 50 asks an adequate code to the SSMS 70 while providing the received numbers and the called's state, namely idle state for the SSMS 70 (S607). The SSMS 70 examines a tone service table allocated for the called number to determine a code matched with the calling number and the idle state, and informs the sound storager 50 of the determined code (S608) in response to the code-requesting step S607. The sound storager 50 transmits a tone-replacing sound corresponding to the determined code to the first caller as an RBT through the trunk path to the first originating exchanger 33 (S609).

If the called answers call arrival from the terminating exchanger 32 while the determined tone-replacing sound is being transmitted instead of a conventional RBT, the terminating exchanger 32 requests the sound storager 50 to release the established trunk connection (S610). Then, voice or data are communicated between the first caller and the called through the trunk connection between the first originating 33 and the terminating exchanger 32 (S611).

If a second arbitrary subscriber within a service zone of a second originating exchanger 31 calls the called who is talking over the connected line with the first caller, the second originating exchanger 31 requests the terminating exchange 32 to make a trunk connection therebetween (S621) according to the same steps S501 to S505 that are described in the procedure of FIG. 5.

Afterwards, the above-explained steps S506 to S509 are sequentially conducted in this embodiment. However, the called's state to delivered at this time from the terminating exchanger 32 to the sound storager 50 is 'busy'. Therefore, a tone-replacing sound, e.g., voice message to inform "busy in CWS" is provided for the second caller instead of a conventional RBT.

While the second caller is waiting call acceptance, if the called accepts the call from the second caller while forcing the current connection to be in call-suspended, namely, call-waiting state, the terminating exchanger 32 acknowledging the call switch releases the trunk connection to the sound storager 50, which was established before by the call of the second caller, in order to stop transmission of the tone-replacing sound. Now, voice or data are communicated between the second caller and the called through the trunk connection between the second originating exchanger 31 and the terminating one 32 (S622).

In addition, when the terminating exchanger 32 acknowledges the call switch, it requests another trunk connection to the sound storager 50 for the suspended call of the first caller (S623). This requesting message from the terminating exchanger 32 contains mobile telephone numbers of the called and/or the caller and call-waiting state.

Now, respective trunk connections are made between the two originating exchangers 31 and 33 and the terminating one 32, and an additional trunk connection is made between the terminating exchanger 32 and the sound storager 50 for the first caller.

The sound storager 50 asks an adequate code to the SSMS 70 while providing the received numbers and the called's state, namely call-waiting state for the SSMS 70 (S624). The SSMS 70 examines the tone service table, structured as FIG. 8, allocated for the called number to determine a code matched with the calling number and the call-waiting state, and informs the sound storager 50 of the determined code (S625) in response to the code-requesting step S624. The sound storager 50 transmits a tone-replacing sound corresponding to the determined code to the first caller as a CWT through the trunk path to the first originating exchanger 33 (S626).

Therefore, if a voice message to inform that call is suspended is registered as a tone-replacing sound for call-waiting state in CWS, a suspended caller is able to know the current call state through the tone-replacing sound. This would decrease callers' call drops by preventing misunderstanding that a call is disconnected unexpectedly.

In the above-explained embodiment of FIG. 6, the terminating exchanger 32 may not release the trunk connection which is made at the step S606 or S621 although the connection to the sound storager 50 becomes unnecessary by call connection or a busy called's call acceptance. In this case, remaking of trunk connection, e.g., the step S623 in the embodiment of FIG. 6 can be skipped.

The present invention is not restricted to the above-explained embodiments of FIGS. 5 and 6. In other words, if the tone service table in the SSMS 70 is adequately structured or modified and suitable information is served to the sound storager 50 from a terminating exchanger, various tones such as RBT, busy tone, CWT and so forth can be replaced with an arbitrary sound, music or voice that is selected for a called based on who the caller is, which group among groups classified by the called the caller belongs to, caller's age, sex, occupation, called time, call state and/or other factors.

In the present tone-replacing sound providing service, a subscriber can access the HLR 10 to change the SRBT field of the value-added service parameters.

For instance, when a subscriber presses a special key on his or her mobile telephone the pressed key information is delivered to the HLR 10 which changes the 2-bit SRBT field based on the key information or alternately. However, more significant bit of the two can not be altered because it indicates whether or not subscribed to the tone replacement service. Less significant bit can be altered by the above way because it indicates whether the tone replacement service is activated or not.

Thus, in case of a person having subscribed to tone replacement service, The SRBT field of the value-added service parameters for that person has a value of '10' or '11' only where the value '10' is indicative of 'inactive' of the service and '11' indicative of 'active'.

The special key commands change the 'SRBT' field from '10' to '11' or from '11' to '10'. Consequently, a subscriber can determine at will whether to use a conventional RBT, busy tone, and CWT or to use tone-replacing sound he or she has chosen. If the 'SRBT' field is '10', a terminating exchanger transmits a conventional RBT, busy tone or CWT to a caller or a call-waiter even if a called has subscribed to the tone replacement service.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing an arbitrary sound to replace a conventional tone in a communication network, comprising:
   a first step, conducted by an HLR (Home Location Register), of furnishing a call-receiving exchanger, when a location of a call-receiving terminal is registered through the call-receiving exchanger and before a call-sending is attempted from a call-sending terminal to the call-receiving terminal, with first information on whether an ordinary tone is to be replaced or not and second information informing a route to a sound providing means;
   a second step, conducted by the call-receiving exchanger, of requesting a first trunk connection to the sound providing means, if the call-receiving terminal is called by a second-in-time call-sending terminal under already-connected condition to a first-in-time terminal, based on the first and the second information while providing the sound providing means with third information on call state;

a third step, conducted by the sound providing means, of determining a tone-replacing sound based on the received third information for the call-receiving terminal, and providing the determined tone-replacing sound as a ringback tone to the second-in-time call-sending terminal-through the call-receiving exchanger;

a fourth step, conducted by the call-receiving exchanger, of requesting release of the first trunk connection to the sound providing means, if the call-receiving terminal accepts the call from the second-in-time call-sending terminal, and requesting a second trunk connection to the sound providing means for the connected first-in-time terminal while providing the sound providing means with fourth information on call-switched; and a fifth step, conducted by the sound providing means, of determining a tone-replacing sound based on the received fourth information for the call-receiving terminal, and providing the determined tone-replacing sound as a call-waiting tone to the first-in-time terminal through the call-receiving exchanger which the second trunk connection is made to;

wherein the sound providing means determines the tone-replacing sound based on an identity associated with the call-sending terminal, which group the call-sending terminal belongs to among several groups classified by a user of the call-receiving terminal, and/or calling time.

2. The method of claim 1, wherein the fourth information is to indicate that either of the call-sending terminal calls is suspended to wait for call reconnection.

3. The method of claim 1, wherein the third information is to indicate that the terminal is busy.

4. The method of claim 1, wherein the first information on whether an ordinary tone is to be replaced or not is set in the HLR based on specific key information received from the call-receiving terminal.

5. The method of claim 1, wherein the first and the second information are included in a response message to a location registration request message, the response message being sent from the HLR to the call-receiving exchanger.

6. The method of claim 1, wherein a message to request the trunk connection to the sound providing means includes called-identification and caller-identification information.

7. The method of claim 1, wherein the sound providing means changes a current tone-replacing sound specified for the call-receiving terminal with another one through communication with a web server operating based on internet protocol.

* * * * *